United States Patent
Chou

(10) Patent No.: US 7,203,855 B2
(45) Date of Patent: Apr. 10, 2007

(54) POWER-SAVING CONTROL CIRCUITRY OF ELECTRONIC DEVICE AND OPERATING METHOD THEREOF

(75) Inventor: Kóbe Chou, Hsin-Tien (TW)

(73) Assignee: VIA Technolgoies, Inc., Taipei Hsien (TW)

( * ) Notice: Subject to any disclaimer, the term of this patent is extended or adjusted under 35 U.S.C. 154(b) by 403 days.

(21) Appl. No.: 10/817,776

(22) Filed: Apr. 2, 2004

(65) Prior Publication Data

US 2005/0097377 A1    May 5, 2005

Related U.S. Application Data

(60) Provisional application No. 60/516,240, filed on Oct. 31, 2003.

(30) Foreign Application Priority Data

Mar. 8, 2004    (TW) ............................ 93106005 A

(51) Int. Cl.
*G06F 1/32*    (2006.01)
*G06F 1/00*    (2006.01)
*G11C 5/14*    (2006.01)

(52) U.S. Cl. .................... 713/320; 713/324; 365/227

(58) Field of Classification Search ................ 713/320, 713/322, 323, 300; 327/544; 365/227
See application file for complete search history.

(56) References Cited

U.S. PATENT DOCUMENTS

| | | | |
|---|---|---|---|
| 5,025,387 A | 6/1991 | Frane | 364/493 |
| 5,504,908 A * | 4/1996 | Ikeda | 713/300 |
| 6,072,348 A | 6/2000 | New et al. | 327/295 |
| 6,466,073 B1 | 10/2002 | Yukinari et al. | 327/291 |
| 6,557,107 B1 * | 4/2003 | Kim | 713/320 |
| 6,587,956 B1 | 7/2003 | Hiratsuka et al. | 713/500 |

FOREIGN PATENT DOCUMENTS

| | | |
|---|---|---|
| EP | 0242010 | 10/1987 |
| GB | 2246455 | 1/1992 |
| GB | 2315578 | 2/1998 |
| JP | 01-120610 | 5/1989 |
| JP | 10-161767 | 6/1998 |
| TW | 86109887 | 7/1997 |
| WO | WO 2004/001564 | 12/2003 |

* cited by examiner

*Primary Examiner*—Chun Cao
*Assistant Examiner*—Suresh K Suryawanshi
(74) *Attorney, Agent, or Firm*—J.C. Patents

(57) ABSTRACT

A power-saving control circuitry of an electronic device is provided. The power-saving control circuitry comprises a power control circuit, an oscillator, a clock pulse generator, a reserve circuit and a multi-enable module. When the electronic device enters a power saving mode, the oscillator stops generating oscillatory timing signals and the clock pulse generator stops generating operational clock signals. Because digital timing signals are generated by either the oscillatory timing signals or the operational clock signals, digital timing signals also stop. Furthermore, power to the flash ROM of the electronic device could be cut off by the signals sent to the oscillator, the clock pulse generator or the multi-enable module from the power control circuit as well.

11 Claims, 12 Drawing Sheets

POWER-SAVING CONTROL CIRCUITRY OF ELECTRONIC DEVICE AND OPERATING METHOD THEREOF

CROSS-REFERENCE TO RELATED APPLICATION

This application claims the priority benefits of U.S. provisional application titled "A NEW CHIP DESIGN" filed on Oct. 31, 2003, Ser. No. 60/516,240. All disclosure of this application is incorporated herein by reference. This application also claims the priority benefit of Taiwan application serial no. 93106005, filed on Mar. 8, 2004.

BACKGROUND OF THE INVENTION

1. Field of the Invention

The present invention relates to a power-saving control circuitry and a control method. More particularly, the present invention relates to a power-saving control circuitry of an electronic device and the controlling method thereof.

2. Description of the Related Art

FIG. 1 is a schematic block diagram showing the power control circuitry of a conventional electronic device (for example, an integrated circuit or an application specific integrated circuit). As shown in FIG. 1, the electronic device has a power control circuit 101. The power control circuit 101 receives a digital clock signal DCLK to control a clock pulse generator circuit 103. The clock pulse generator circuit 103 generates a plurality of clock signals CLK1, CLK2, CLK3 and CLK4, which are sent to various principal integrated circuit chips (for example, digital circuits) 105, 107, 109 and 111. When the electronic device enters into an power-saving mode (such as a stand-by or a sleep mode), the power control circuit 101 controls the clock pulse generator circuit 103 to stop sending clock signals CLK1, CLK2, CLK3, CLK4 so that power to the IC chips are temporarily shut down to save power.

Yet, the conventional power control circuit has few drawbacks. When the electronic device enters into a stand-by or a sleep mode, power to the IC chips can only be cut by stopping all the clock signals going to the IC chips. Furthermore, power to the power control circuit 101 has to be maintained because the power control circuit 101 still has to receive external signals and the digital clock signal DCLK cannot be stopped for just one moment. Hence, any further reduction of current is prevented.

In addition, most conventional electronic devices have additional memory units to assist the operation of various IC chips aside from the normal circuits (digital or analogue). However, only static random access memory has an automatic power shutdown design to cut off power all by itself. Other types of memories comprising the flash ROM has no self-switching design so that these devices must be turned on or off with the help of an external control circuit. Therefore, unlike the IC chips that can be controlled by the clock signal circuits as shown in FIG. 1, a special circuit must be set inside the power control circuitry for controlling the memory units. In other words, complicated circuit design has to be introduced and the production cost bound to be higher.

SUMMARY OF THE INVENTION

Accordingly, the present invention provides an electronic device having a power-saving control circuitry such that the electronic device can almost be regarded as in a complete power shut down when the electronic device is in a power-saving mode. Furthermore, no special circuit for shutting down memory devices is required because the circuit for shutting down various IC chips can be used to shut down the memory devices.

The present invention provides a power-saving control circuitry for an electronic device. The electronic device has an internal digital circuit. The power-saving control circuitry comprises a power control circuit, an oscillator, a clock pulse generator and a multi-enable module. The power control circuit is not activated by a clock signal. Moreover, the power control circuit provides an oscillator power signal to the oscillator, a clock power signal to the clock pulse generator and a digital power signal to multi-enable module for controlling their respective activation or shut down. Power to the oscillator and the clock pulse generator are cut off based on the oscillator power signal and the clock power signal. In addition, the oscillator provides an oscillator clock signal to the clock pulse generator so that the clock pulse generator can produce an operational clock signal based on the oscillator clock signal. The multi-enable module utilizes a select signal to choose between using the operational clock signal or the oscillator clock signal to produce the digital clock signal. The digital clock signal is sent to the digital circuit based on the digital power signal. An externally generated signal is used to wake up the power control circuit. Furthermore, that portion of the digital circuits that cannot be stopped after turning the clock signal off is set aside as an independent reserve circuit and particularly coupled to the oscillator for receiving oscillator clock signals. In addition, the power control circuit may transmit at least one of the oscillator power signals, the clock power signal or the digital power signal to a memory (such as flash ROM) that operates in tandem with the digital circuit. Hence, the operation or shut down of the memory can be controlled through the power control circuit. In the present invention, the multi-enable module can be constructed using a multiplexer and an AND gate.

The present invention also provides an alternative power-saving control circuitry for an electronic device. The electronic device has an internal digital circuit. The power-saving control circuitry comprises an oscillator, a clock pulse generator, a frequency divider and a multiplexer. The oscillator provides an oscillator clock signal to the frequency divider and the clock pulse generator. The clock pulse generator provides an operational clock signal based on the oscillator clock signal. The frequency divider divides the frequency of the received oscillator clock signal by N (a positive integer) to produce a frequency-divided clock signal. The multiplexer selects the oscillator clock signal, the operational clock signal or the frequency-divided clock signal based on a select signal to produce a digital clock signal for the digital circuit. In addition, the multiplexer or the digital circuit may transmit a signal to a memory (such as flash ROM) that operates in tandem with the digital circuit for controlling the operation or shut down of the memory.

The present invention also provides a method of reducing the power consumption of an electronic device. The electronic device has a digital circuit that receives digital clock signals in normal operation. In normal operation, the electronic device uses an operational clock signal to produce the digital clock signal. The power-saving method at least comprises using an oscillator clock signal instead of the operational clock signal to generate the digital clock signal. The operational clock signal has a frequency higher than the oscillator clock signal. A clock power signal is enabled to stop generating the operational clock signal. Thereafter, a digital power signal is enabled to stop generating the digital clock signal. Certainly, an external event will reactivate the oscillator clock signal so that the electronic device returns to a normal operation. Furthermore, the enabling signal may also transmitted to a memory that operates in tandem with the digital circuit so that power to the memory is cut when the production of the digital clock signal stops. In addition, that portion of the digital circuits that demands a continuous reception of digital clock signals for normal operation can be set aside as an independent reserve circuit. Hence, shutting down the digital clock signal while maintaining the oscillator clock signals will shut down the digital circuit without ending the operation of the reserve circuit.

The present invention also provides an alternative method of reducing the power consumption of an electronic device. The electronic device has a digital circuit that receives digital clock signals in normal operation. In normal operation, the electronic device uses an operational clock signal to produce the digital clock signal. The power-saving method at least comprises dividing the frequency of an oscillator clock signal by N (a positive integer) to produce a frequency-divided clock signal. The oscillator clock signal has a frequency lower than the operational clock signal. According to the operation of the electronic device, either the operational clock signal or the frequency-divided clock signal is used to produce the digital clock signal for the digital circuit. Of course, an external event could reactivate the oscillator clock signal so that the electronic device returns to a normal operation. Furthermore, if the electronic device contains a memory (such as flash ROM), a signal based on the frequency-divided clock signal may be transmitted to cut off memory power.

In brief, the power control circuit according to the present invention is not a clock signal activated circuit. Thus, the power control circuit may stop the production of digital clock signals when the electronic device is in a power-saving mode so that more electric power can be saved. Furthermore, circuits within the electronic device that cannot be shut down in the power-saving mode (for example, the refreshing operations of dynamic random access memory (DRAM)) can be set aside as an independent reserve circuit or specially set to receive a lower frequency clock signal directly from the digital circuit. In either way, some power energy is saved. In addition, the signal for shutting down the digital circuit in the power-saving mode can be directly used to cut off memory power and reach a higher power efficiency level.

It is to be understood that both the foregoing general description and the following detailed description are exemplary, and are intended to provide further explanation of the invention as claimed.

BRIEF DESCRIPTION OF THE DRAWINGS

The accompanying drawings are comprised to provide a further understanding of the invention, and are incorporated in and constitute a part of this specification. The following drawings illustrate embodiments of the invention and, together with the description, serve to explain the principles of the invention.

DESCRIPTION OF THE PREFERRED EMBODIMENTS

Figure 1:
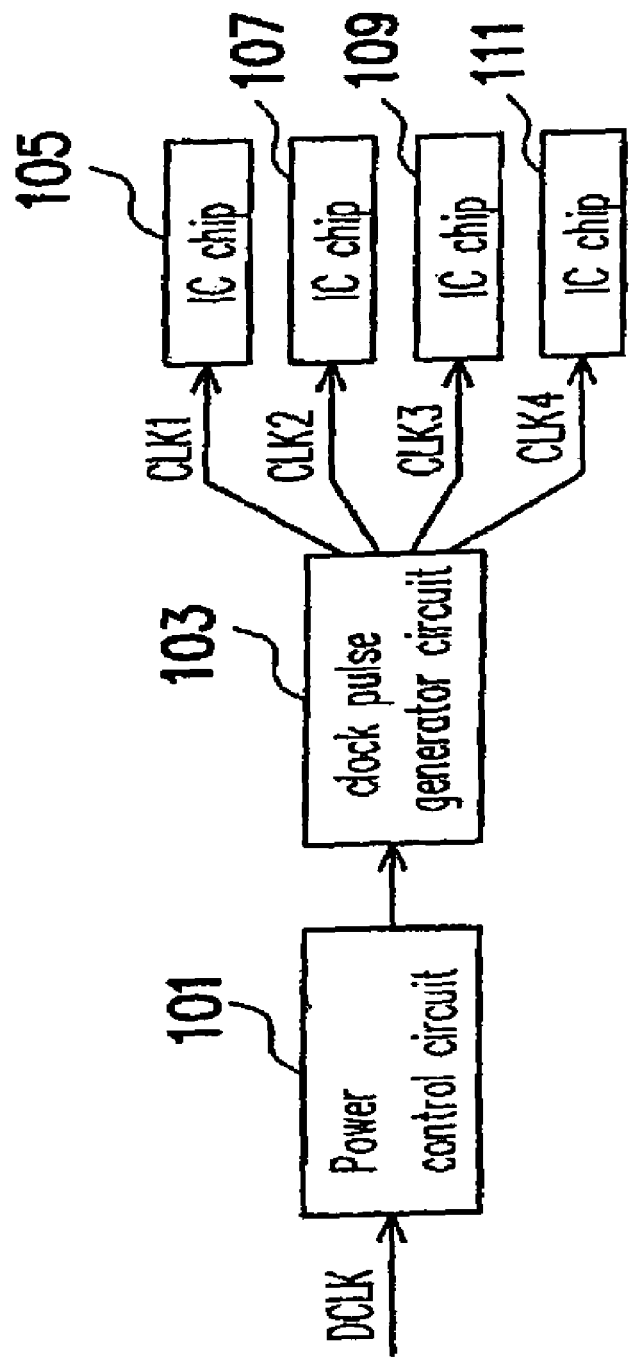
FIG. 1 is a schematic block diagram showing the power control circuitry of a conventional compact disk device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
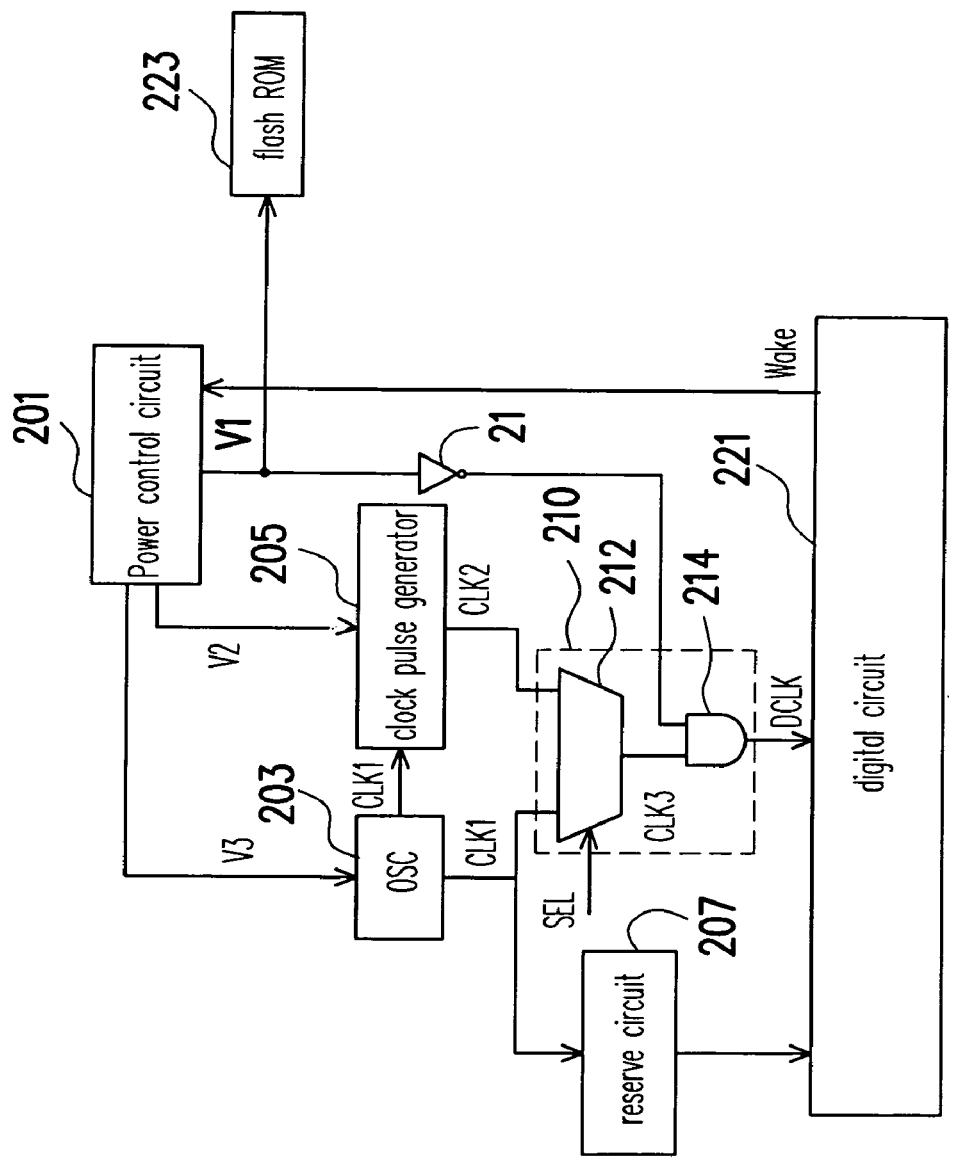
FIG. 2 is a schematic block diagram showing a power-saving control circuitry inside an electronic device according to one preferred embodiment of present invention.

FIG. 2 is a schematic block diagram showing a power-saving control circuitry inside an electronic device according to one preferred embodiment of present invention. As shown in FIG. 2, the power-saving control circuitry comprises a power control circuit 201, an oscillator (OSC) 203, a clock pulse generator 205, a reserve circuit 207 and a multi-enable module 210. The power control circuit 201 transmits signals to the oscillator (OSC) 203 and the clock pulse generator 205. If the electronic device comprises a flash ROM 223, signals are transmitted to the flash ROM 223 (for example, the chip select terminal CS of the flash ROM) as well. The power control circuit 201 may transmit a signal (for example, through an inverter 21) to the multi-enable module 210. The reserve circuit 207, which contains part of the circuits inside the digital circuit 221 whose operation cannot be stopped, such as cannot be stopped in the sleep mode, is coupled to a digital circuit 221. Furthermore, the power control circuit 201 also has a terminal for detecting external events so that the electronic device can wake up from the power-saving mode.

In normal operation mode, the oscillator 203 transmits an oscillator clock signal CLK1 to the clock pulse generator 205 and the multi-enable module 210. According to the oscillator clock signal CLK1, the clock pulse generator 205 transmits an operational clock signal CLK2 to the multi-enable module 210. The multi-enable module 210 transmits a digital clock signal DCLK to the digital circuit 221 based on a digital power signal V1 provided by the power control circuit 201. The digital circuit 221 operates according to the digital clock signal DCLK. In this embodiment, the multi-enable module 210 can be constructed by connecting a multiplexer 212 and an AND gate 214 together. The multiplexer 212 selects either the oscillator clock signal CLK1 or the operational clock signal CLK2 to produce an output clock signal CLK3 to the AND gate 214 according to an externally triggered select SEL signal. The AND gate 214 outputs a digital clock signal DCLK to the digital circuit 221 according to whether the digital power signal V1 from the power control circuit 201 is enabled or not.

In this embodiment, when the electronic device enter into a power-saving mode such as a standby or a sleep mode, the multiplexer 212 selects the oscillator clock signal CLK1 produced by the oscillator 203 to generate another oscillator clock signal CLK3. In the meantime, the power control circuit 201 enables the clock power signal V2 to shut down the clock pulse generator 205 so that the production of operational clock signal CLK2 stops. Thereafter, the power control circuit 201 enables the digital power signal V1 to disable the AND gate and prevent the output of any digital clock signal DCLK. Without the provision of a digital clock signal DCLK, power to the digital circuit 221 is severed. In the present state, if there is any circuit inside the digital circuit 221 that cannot work without clock signals such as the refreshing of dynamic memory, the circuit is separated out and preserved in the reserve circuit 207 (obviously, such circuits can be copied but results in circuit duplication). The reserve circuit 207 continues to operate normally by receiving oscillator clock signal CLK1 from the oscillator 203 (hence, the oscillator 203 must not be shut down). In addition, the chip select terminal CS of a flash ROM 223 can be disabled when the power control circuit 201 enables the digital power signal V1 so that power to the flash ROM 223 is also cut.

Furthermore, if all functional circuits inside the digital circuit 221 can operate in the power-saving mode, the digital circuit 221 can be powered down completely. In this case, the power control circuit 201 can enable the oscillator power signal V3 to shut down the oscillator 203 so that the oscillator clock signal CLK1 is no longer produced. Furthermore, when an external event such as someone pressing the keyboard of the electronic device or an external device demands a data exchange, the non-synchronously controlled power control circuit 201 receives a wake up signal. Thereafter, the power control circuit 201 signals to reactivate the oscillator 203 and the clock pulse generator 205 so that the electronic device returns to normal operation.

In this embodiment, the power control circuit 201 can operate without any external clock signal. In the power-saving mode, only the oscillator clock signal CLK1 is required even if the reserve circuit 207 must continue to operate. The oscillator clock signal CLK1 has an operating frequency far lower than the operational clock signal CLK2 and the digital clock signal DCLK. Hence, the oscillator 203 consumes very little power. If the digital circuit 221 can be completely shut down, the oscillator 203 may stop producing the oscillator clock signal CLK1 so that the power consumed is even lower. In addition, the power consumed by the flash ROM 223 inside the electronic device is considerable. When the electronic device is in the power-saving mode, the oscillator power signal V3, the clock power signal V2 or the digital power signal V1 can be channeled to the flash ROM 223 to shut down the memory to save some power energy. In this embodiment, the power control circuit 201 utilizes the same types of signals for controlling the oscillator 203 or the clock pulse signal 205 to shut down the flash ROM 223. Since there is no need to design another set of circuits, the cost of implementing such power-saving control circuitry is low. Significantly, the concept behind this embodiment is not restricted to flash ROM nor the input signal restricted to the chip select terminal of a memory.

In this embodiment, power to the flash ROM 223 is cut by enabling the digital power signal V1 to disable the chip select CS terminal. However, this is not the only possible design. A circuit that uses the clock power signal V2 or the oscillator power signal V3 to cut the power to the flash ROM 223 is also permitted. Anyone familiar with circuit design may perform the required adjustment to fit the actual conditions in each case.

Figure 3A:
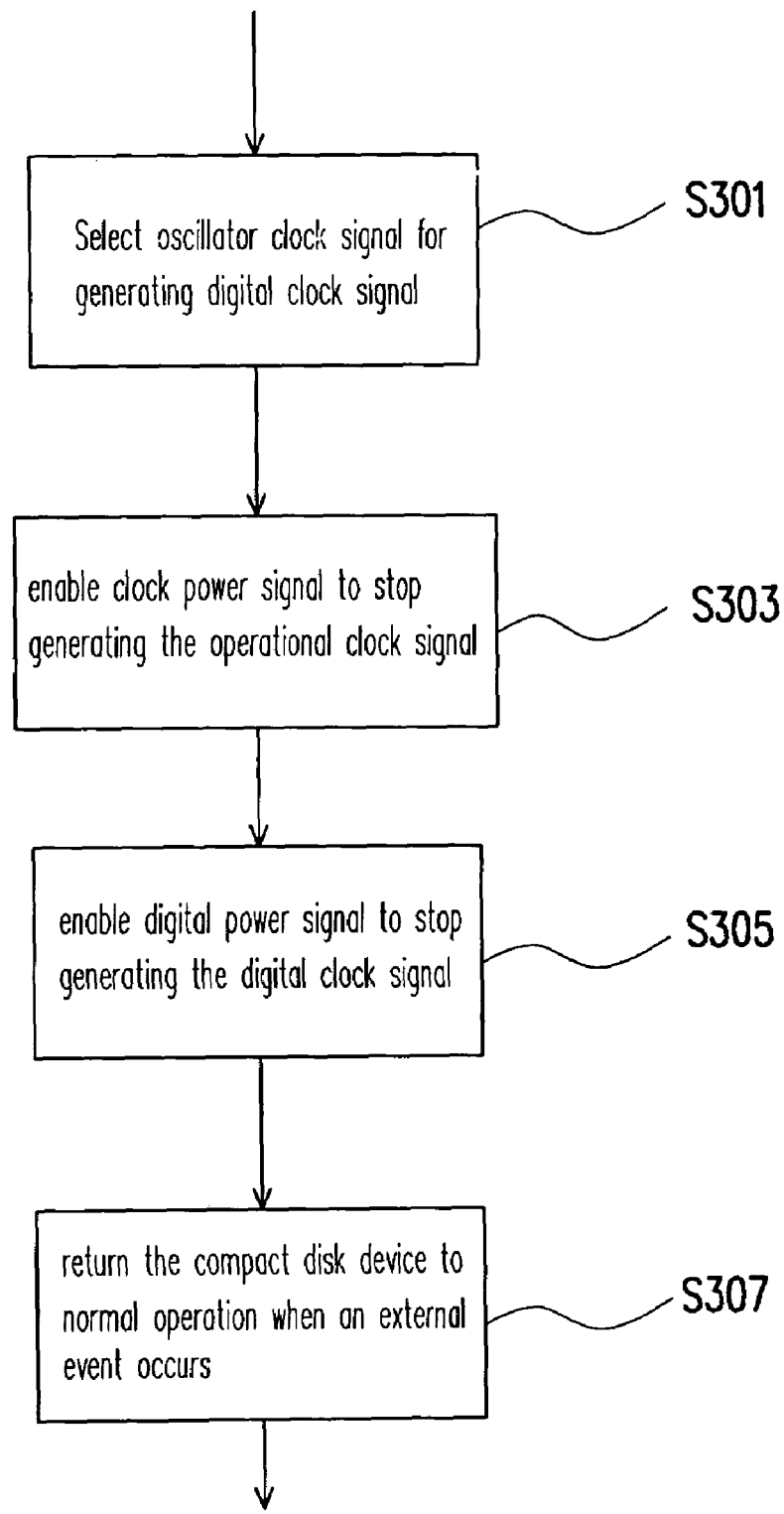
FIG. 3A is a flow-chart showing the steps for saving energy in an electronic device according to one preferred embodiment of present invention.
Figure 6A:
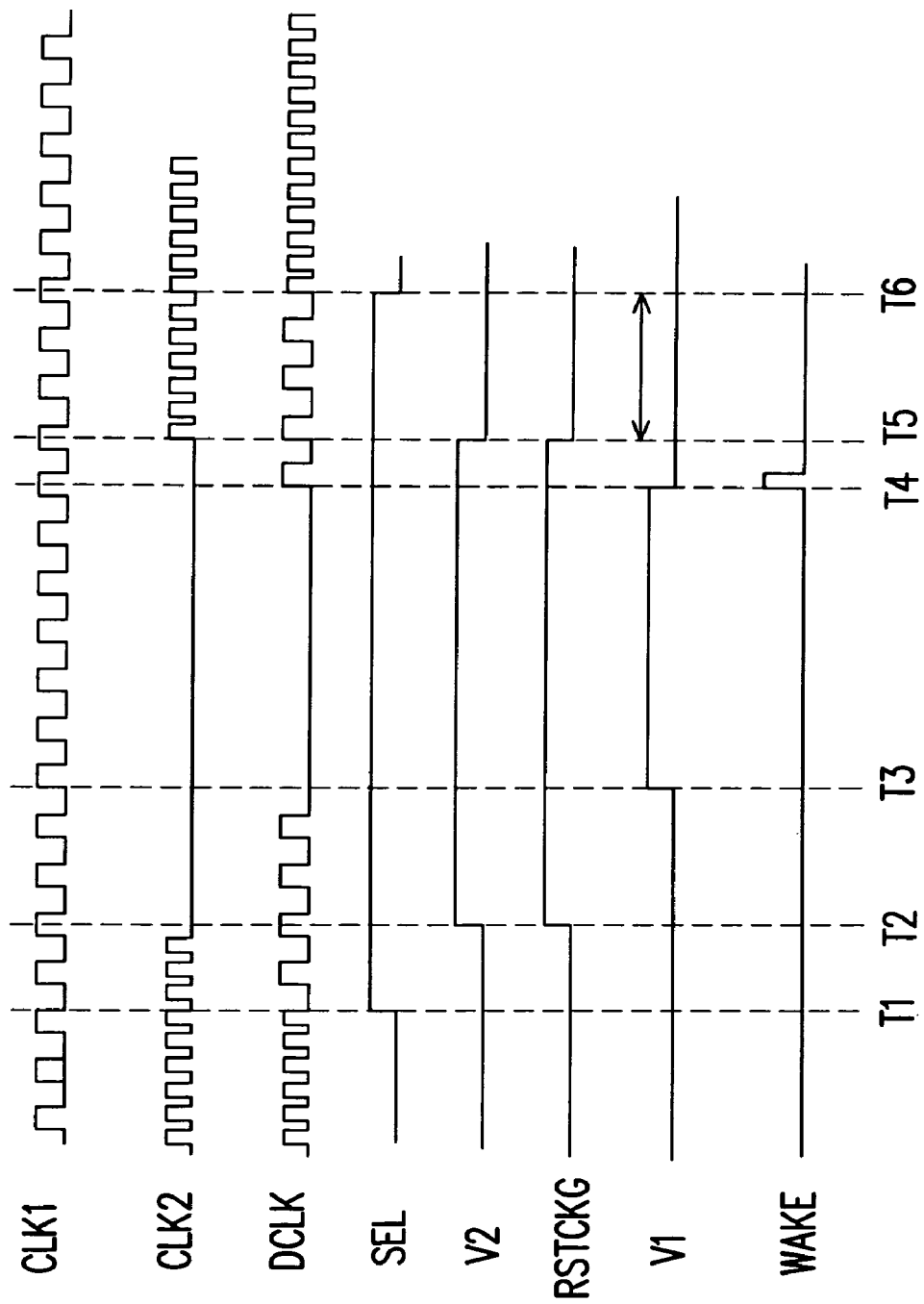
FIG. 6A is a diagram showing various timing signals of a power-saving control circuitry inside a compact disk according to one preferred embodiment of present invention.

FIG. 3A is a flow-chart showing the process steps of saving power energy in an electronic device according to one preferred embodiment of present invention. FIG. 6A is a diagram showing various timing signals of a power-saving control circuitry inside a compact disk according to the preferred embodiment of present invention. According to the aforementioned embodiment, the present invention is able to provide a method of reducing the power consumption of an electronic device such as a compact disk as shown in FIGS. 3A and 6A. First, in step S301, the select signal SEL is enabled at time T1 to produce the digital clock signal DCLK using the oscillator clock signal CLK1. In step S303, the clock power signal V2 is enabled at time T2 to stop generating the operational clock signal CLK2. In step S305, the digital power signal V1 is enabled at time T3 to stop generating the digital clock signal DCLK. Thereafter, the electronic device is in a power-saving mode. In step S307, an external event occurs at time T4, the digital power signal V1 is disabled at time T4, the clock power signal V2 is disabled at time T5 and finally the select signal SEL is disabled at time T6 so that the electronic device returns to normal operation. It should be noted that a signal might be stabilized (stabilized at a fixed value or at a zero value) before the next signal can be switched on or off (especially when switching on signals) in order to prevent unstable signal effects. In addition, a clock reset signal RSTCKG can be enabled together with the clock power signal V2 so that the operational clock signal CLK2 is simultaneously reset.

Figure 3B:
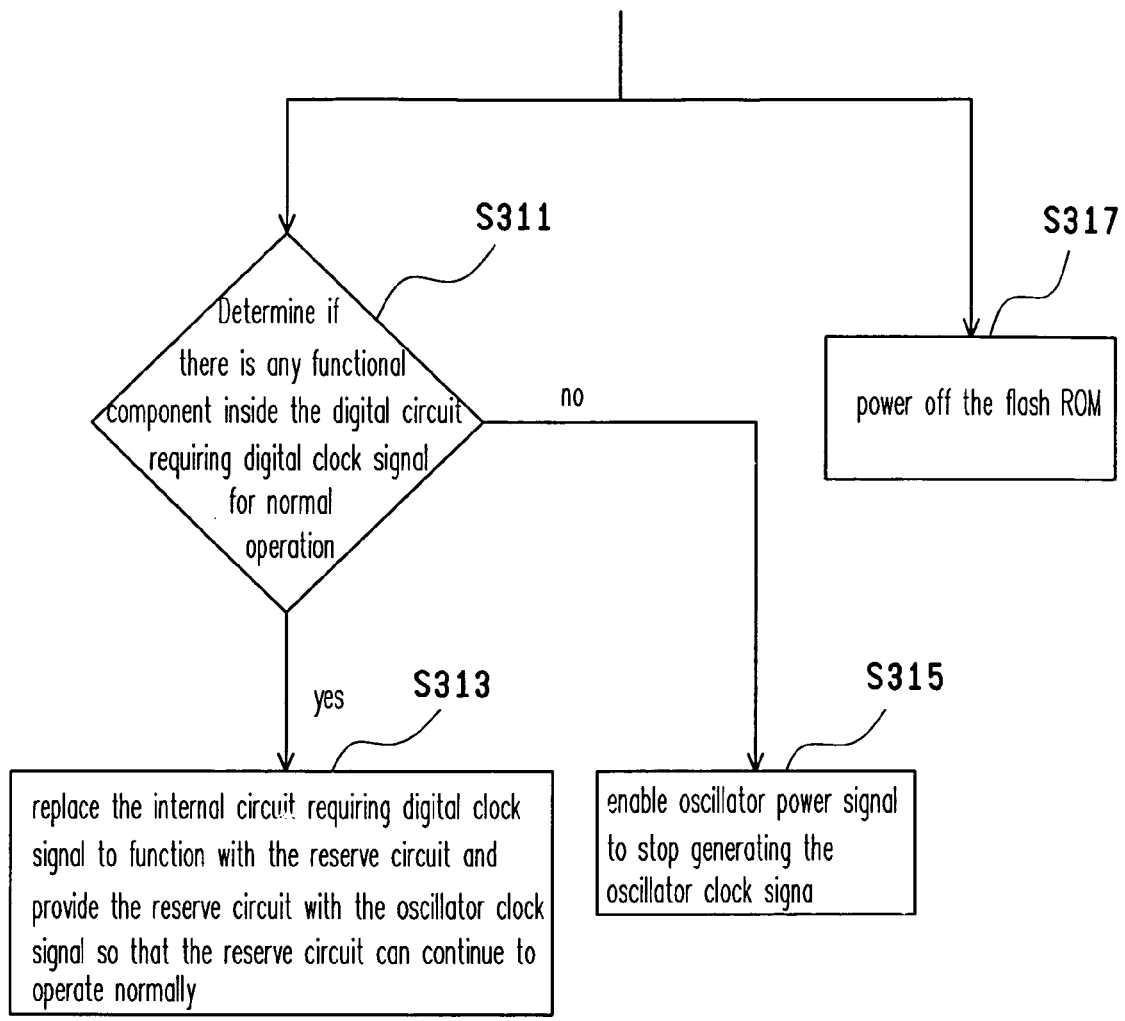
FIG. 3B is a flow-chart showing supplementary steps for saving energy in an electronic device according to one preferred embodiment of present invention.

FIG. 3B is a flow-chart showing supplementary steps for saving energy in an electronic device according to one preferred embodiment of present invention. As shown in FIGS. 2, 3B and 6A, when the digital power signal is enabled in step S311, an assessment is carried out to determine if there is any circuit (for example, dynamic random access memory) that demands digital clock signal DCLK for normal operation (data refreshing operation). If there is circuit requiring the digital clock signal DCLK, step S311 is carried out so that the reserve circuit 207 continues to receive oscillator clock signal CLK1 and performs functions inside the digital circuit 221 that require a clock signal. If circuit requiring the digital clock signal DCLK is absent, step S315 is carried out to enable the oscillator power signal V3 and stop generating the oscillator clock signal CLK1. Furthermore, step S317 may be carried out when the digital power signal V1 is enabled so that the digital power signal V1, the clock power signal V2 and/or the oscillator power signal V3 is transmitted to the flash ROM 223 and cut off its power.

Figure 3C:
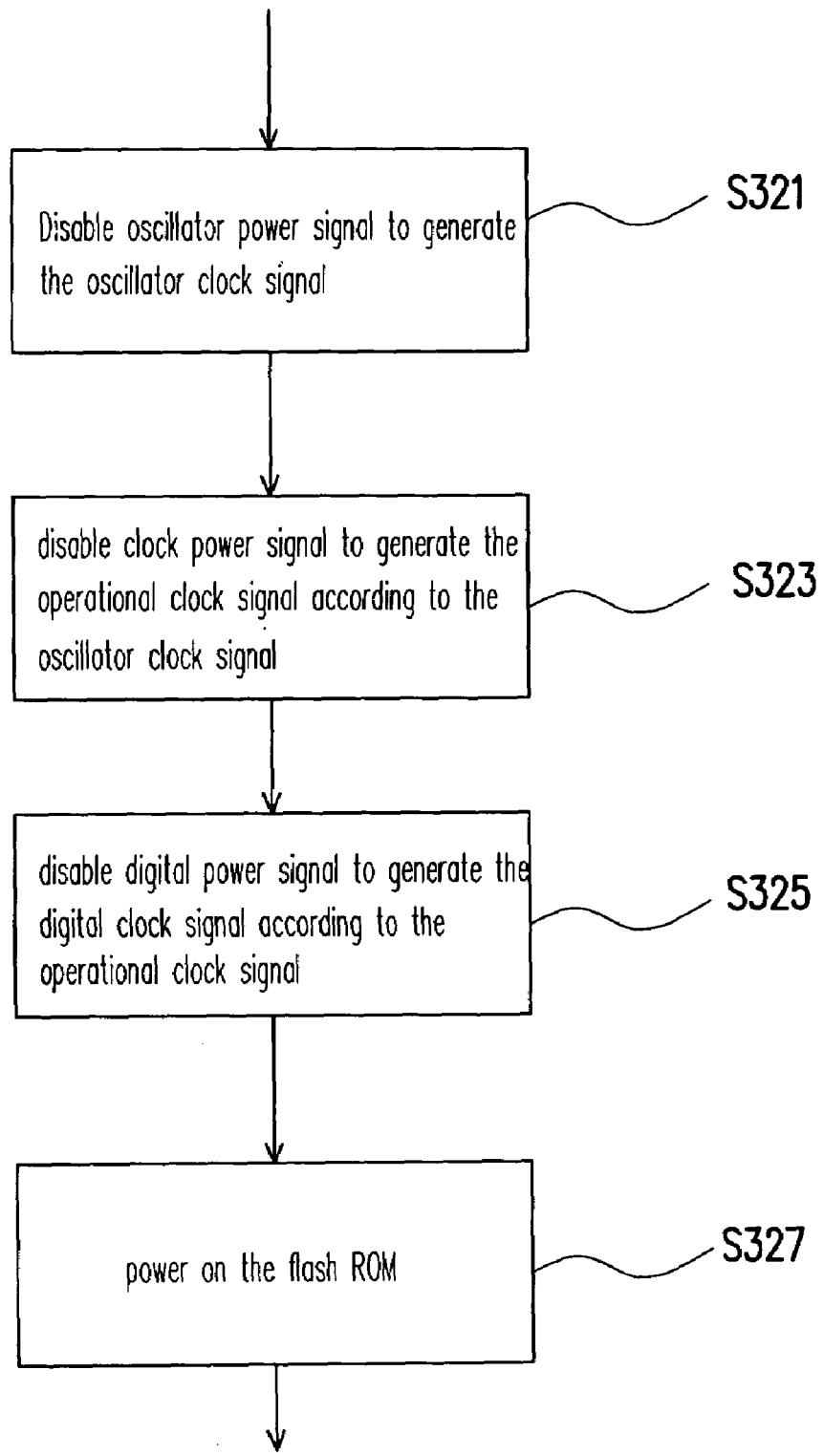
FIG. 3C is a flow-chart showing the steps for returning an electronic device in a power-saving mode back to a normal operation mode according to one preferred embodiment of present invention.
Figure 6B:
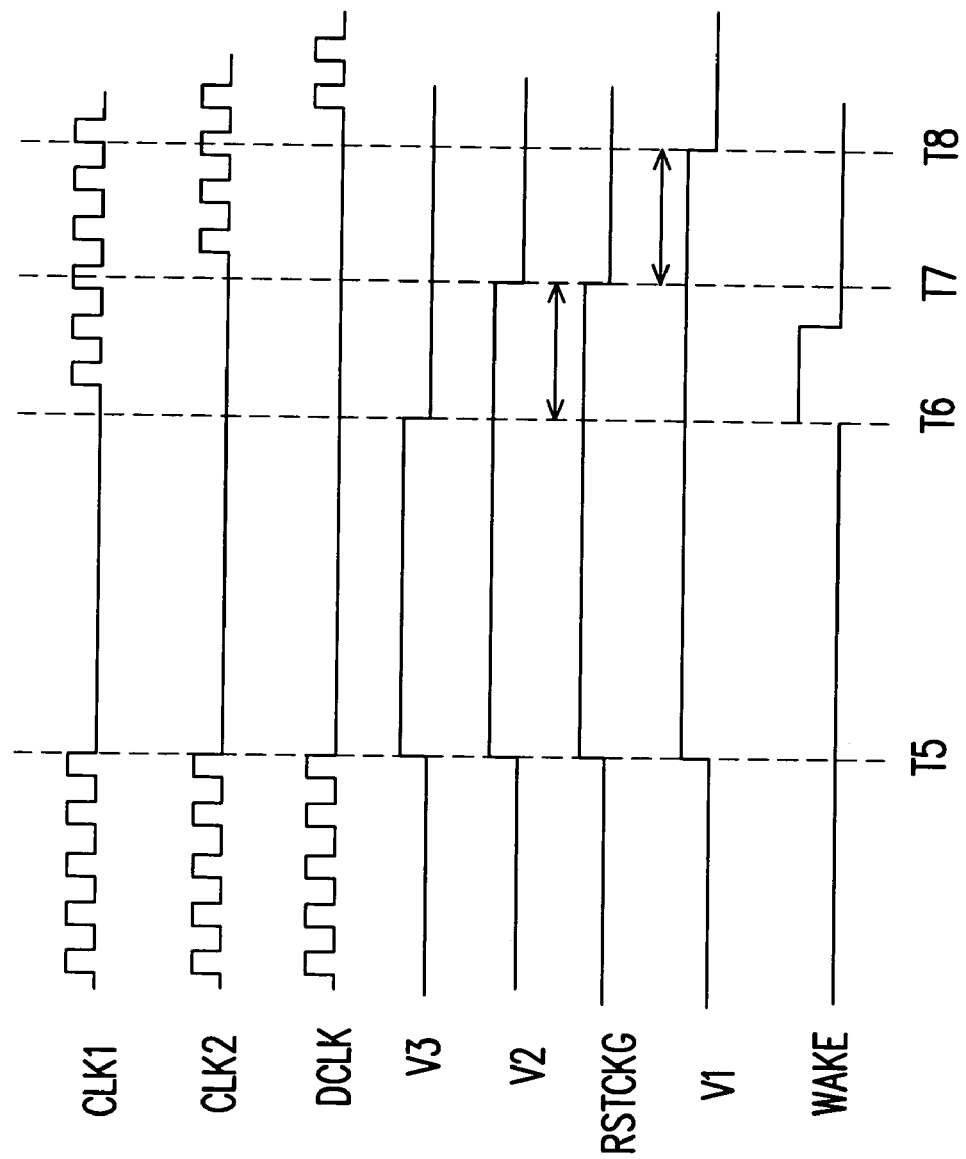
FIG. 6B is a diagram showing various timing signals of an alternative power-saving control circuitry inside a compact disk according to one preferred embodiment of present invention.

FIG. 3C is a flow-chart showing the steps for returning an electronic device in a power-saving mode back to a normal operation mode according to one preferred embodiment of present invention. FIG. 6B is a diagram showing various timing signals of an alternative power-saving control circuitry inside a compact disk according to one preferred embodiment of present invention. As shown in FIGS. 2, 3C and 6B, if an external event occurs at time T6 calling the electronic device to return from the power-saving mode to the normal operation mode, the power control circuit 201 picks up the wake up signal. Thereafter, step S321 is carried out to disable the oscillator power signal V3 and regenerate the oscillator clock signal CLK1. After the oscillator clock signal CLK1 is stabilized, step S323 is carried out to disable the clock power signal V2 at time T7 and regenerate the operational clock signal CLK2 according to the oscillator clock signal CLK1. In this embodiment, the clock reset signal RSTCKG can be disabled at the same time to regenerate the operational clock signal CLK2. After the operational clock signal CLK2 is stabilized, step S325 is carried out to disable the digital power signal V1 at time T8 so that the digital clock signal DCLK is produced according to the operational clock signal CLK2. Finally, in step S327, power to the flash ROM 223 is returned.

Figure 3D:
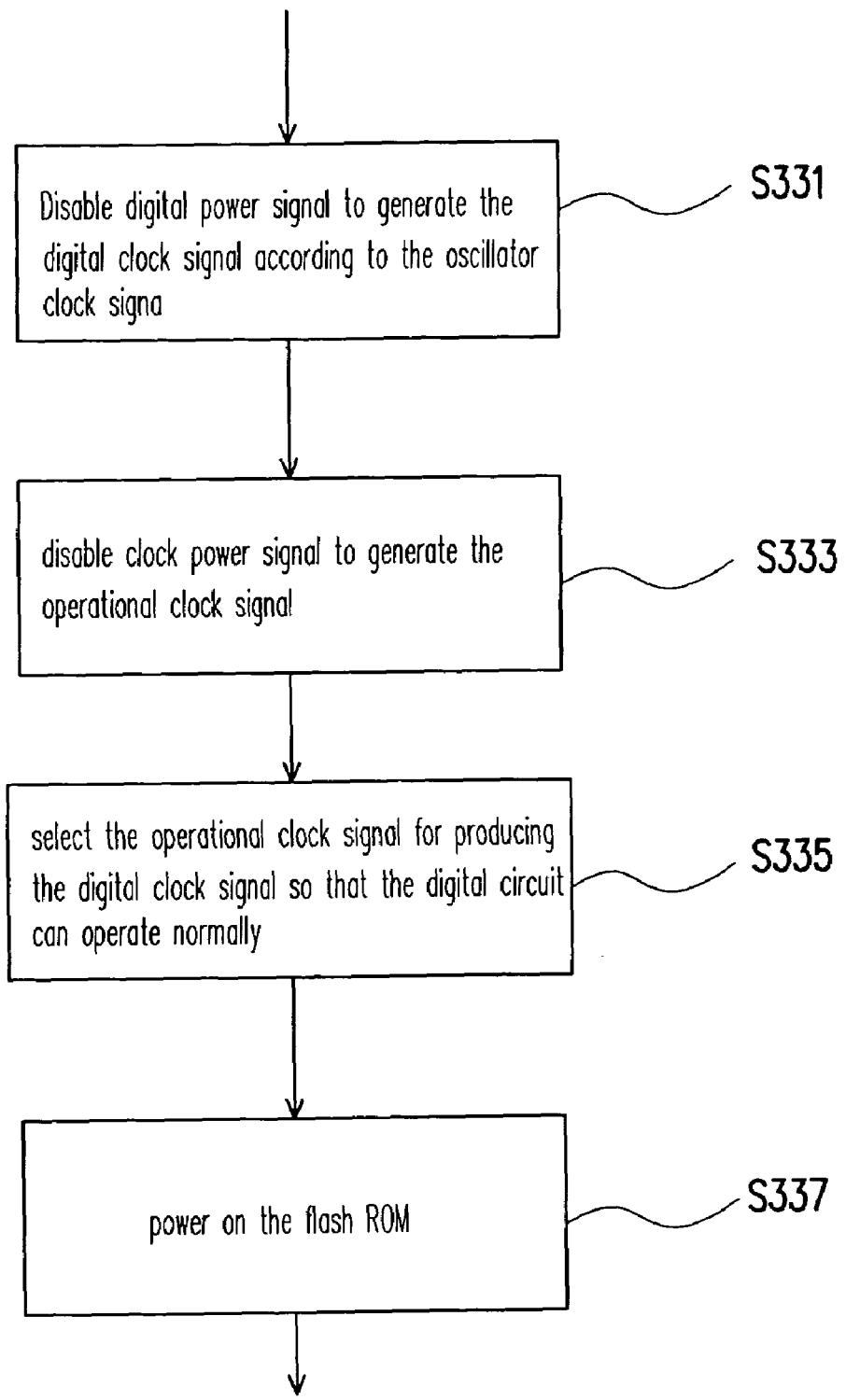
FIG. 3D is a flow-chart showing alternative steps for returning an electronic device in a power-saving mode back to a normal operation mode according to one preferred embodiment of present invention.

FIG. 3D is a flow-chart showing alternative steps for returning an electronic device from the power-saving mode back to the normal operation mode according to one preferred embodiment of present invention. As shown in FIGS. 2, 3D and 6A, if an external event occurs at time T4, the digital control circuit 201 will similarly receive a wake up signal. However, if the oscillator power signal V3 of the electronic device has not been enabled, step S331 is carried out to disable the digital power signal V1 at time T4 so that the digital clock signal CLK3 is produced according to the oscillator clock signal CLK1. After the digital clock signal CLK3 has been stabilized, step S333 is carried out to disable the clock power signal V2 in time T5 and produce the operational clock signal CLK2. Similarly, the clock reset signal RSTCKG can be disabled at the same time. After the operational clock signal CLK2 has been stabilized, step S335 is carried out to disable the select signal SEL and use the operational clock signal CLK2 to produce the digital clock signal CLK3. Consequently, the digital circuit 221 returns to a normal operation.

Figure 4B:
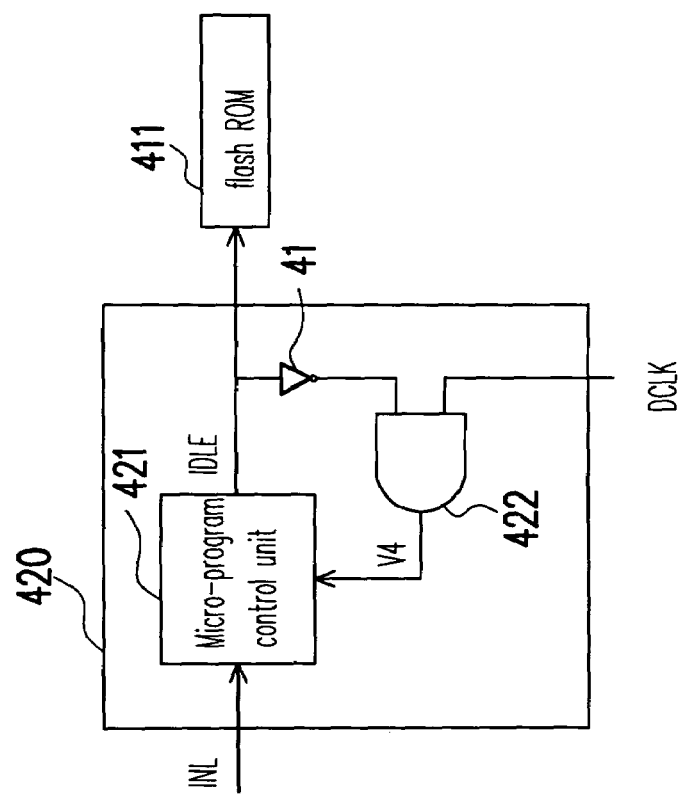
FIG. 4B is a block diagram of a micro-program module according to another embodiment of present invention.
Figure 4A:
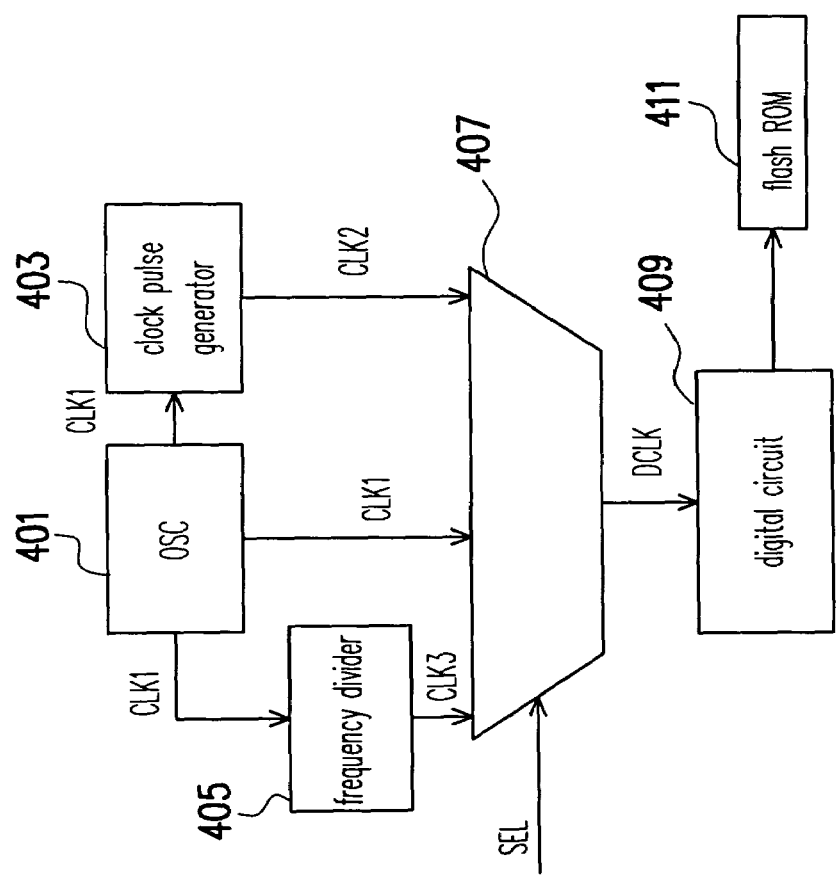
FIG. 4A is a block diagram of a power-saving control circuitry of an electronic device according to another embodiment of present invention.

FIG. 4A is a block diagram of a power-saving control circuitry of an electronic device according to another embodiment of present invention. As shown in FIG. 4A, an oscillator (OSC) 401 transmits an oscillator clock signal CLK1 to a frequency divider 405, a multiplexer 407 and a clock pulse generator 403. The frequency divider 405 transmits a frequency-divided clock signal CLK3 to the multiplexer 407 according to the oscillator clock signal CLK1. The clock pulse generator 403 transmits an operational clock signal CLK2 to the multiplexer 407 according to the oscillator clock signal CLK1. The multiplexer 407 uses either the operational clock signal CLK2 or the frequency-divided clock signal CLK3 to produce a digital clock signal DCLK for transmitting to a digital circuit 409. The digital circuit 409 is also coupled to a flash ROM 411.

The power-saving mode of the electronic device shown in FIG. 4A comprises a standby mode and a sleep mode. When the electronic device enters into a standby mode, a select signal SEL triggers the multiplexer 407 to produce the digital clock signal DCLK using the oscillator clock signal CLK1. Furthermore, in the standby mode, the multiplexer 407 (or the digital circuit 409) may transmit a signal to cut off power to the clock pulse generator 403. Alternatively, the multiplexer 407 (or the digital circuit 409) may transmit a signal to cut off power to the flash ROM 411 (obviously, it also could be any memory whose power can be cut off according to an external signal) linked to the digital circuit 409.

FIG. 4B is a block diagram of a micro-program module according to another embodiment of present invention. As shown in FIG. 4B, this embodiment also provides a micro-program module 420 to power down the flash ROM 411. Furthermore, the micro-program module 420 could be enclosed within the digital circuit 409 (as shown in FIG. 4A) or the multiplexer 407 (not shown) or other place. The micro-program module 420 may comprise an 8051 single chip micro-program control unit 421, for example. When the electronic device enters a standby mode, the micro-program control unit 421 may transmit a memory idle signal IDLE based on a micro-program unit clock signal such as the digital clock signal DCLK to the flash ROM 411 so that power to the flash ROM 411 is shut down. In the meantime, the memory idle signal IDLE is also transmitted to an input terminal of an AND gate 422 after passing through an inverter 41. The other input terminal of the AND gate 422 picks up the digital clock signal DCLK. According to the memory idle signal IDLE, the AND gate 422 determines if a control signal V4 is enabled to cut off power to the micro-program control unit 421. One major aspect of the micro-program control unit 421 is that the memory idle signal IDLE will be disabled by an interrupt signal INT when the micro-program control unit 421 is powered down. Once the memory idle signal is disabled, power to both the micro-program control unit 421 and the flash ROM 411 is turned back on. In other words, an interrupt signal INT triggered by an external event will bring back power to the flash ROM 411.

When the electronic device enters a sleep mode, the select signal SEL triggers the multiplexer 407 in FIG. 4A to produce the digital clock signal DCLK using the frequency-divided clock signal CLK3 from the frequency divider 403. Thereafter, the clock pulse generator 403 is shut down. The frequency-divided signal CLK3 has a frequency obtained by dividing the frequency of the oscillator clock signal CLK1 with a positive integer N. In addition, the digital circuit 409 (or the multiplexer 407) may have a mechanism similar to the aforementioned micro-program module 420 for cutting off power to the flash ROM 411.

In this embodiment, it does not matter whether the electronic device is in the standby mode or the sleep mode, the frequency of the digital clock signal DCLK received by the digital circuit 409 is relatively low. When the electronic device operates in the power-saving mode, power to the flash ROM 411 can be cut just like the previous embodiment. Hence, power consumption of the electronic device in the power-saving mode according to the present embodiment is quite low.

Figure 5A:
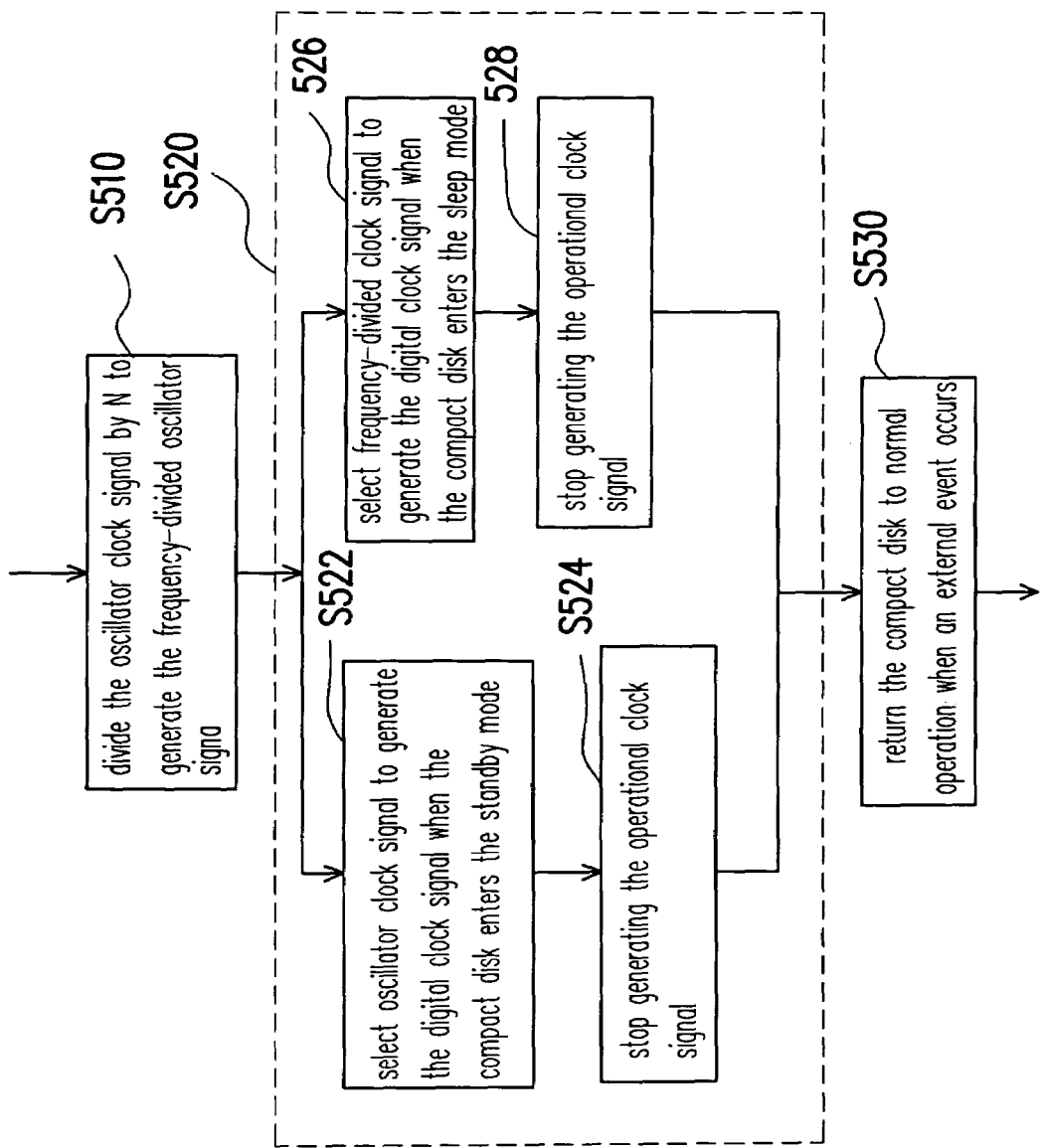
FIG. 5A is a flow-chart showing the steps for saving energy in an electronic device according to another embodiment of present invention.
Figure 6C:
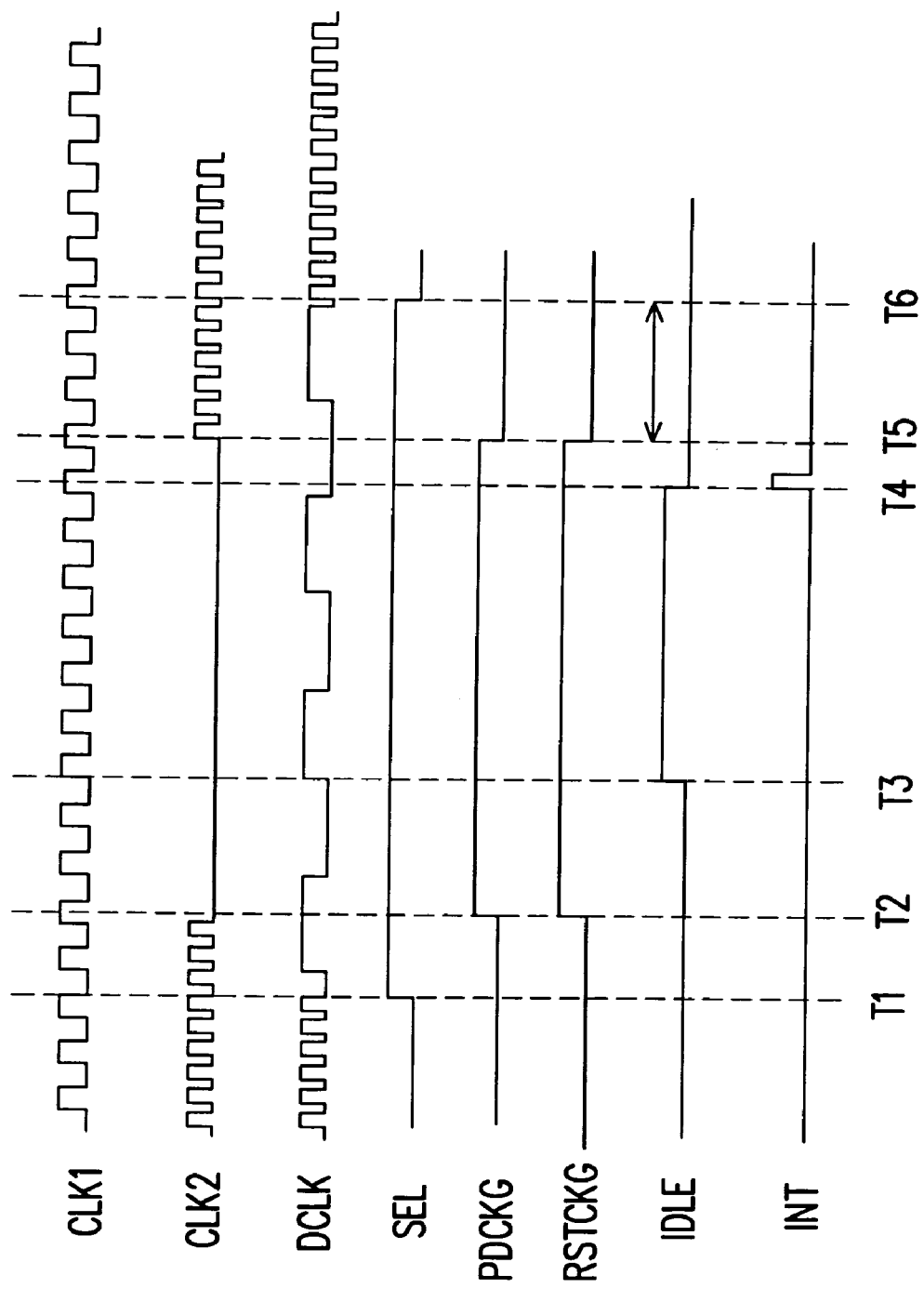
FIG. 6C is a diagram showing various timing signals of a power-saving control circuitry inside a compact disk according to an alternative embodiment of present invention.

FIG. 5A is a flow-chart showing the process steps of saving energy in an electronic device according to another embodiment of present invention. FIG. 6C is a diagram showing various timing signals of a power-saving control circuitry inside a compact disk according to an alternative embodiment of present invention. As shown in FIGS. 4A, 5A and 6C, step S510 is carried out to divide the oscillator clock signal CLK1 by N to produce the frequency-divided clock signal CLK3 where N is a positive number. Thereafter, according to the state of the electronic device, step S520 is carried out to select either the oscillator clock signal CLK1 or the frequency-divided clock signal CLK3 to produce the digital clock signal DCLK. If an external event occurs in step S530 when the electronic device of the present invention in the standby mode or the sleep mode, the electronic device is returned to the normal operation mode. Furthermore, the power-saving method may comprise the triggering of a memory idle signal IDLE at time T3 in FIG. 6C to cut off power to the flash ROM 411.

As shown in FIGS. 4A and 5A, when the electronic device is in the standby mode in step S520, step S522 is performed to produce the digital clock signal DCLK using the oscillator clock signal CLK1. Thereafter, step S524 is carried out to stop generating the operational clock signal CLK2.

As shown in FIGS. 5A and 6C, when the electronic device is in the sleep mode, step 526 is carried out to enable the select signal SEL at time T1 so that the frequency-divided clock signal CLK3 is used to produce the digital clock signal DCLK. Thereafter, step S528 is carried out to enable the clock power signal PDCKG and the clock reset signal RSTCKG at time T2 to stop generating the operational clock pulse CLK2.

Figure 5B:
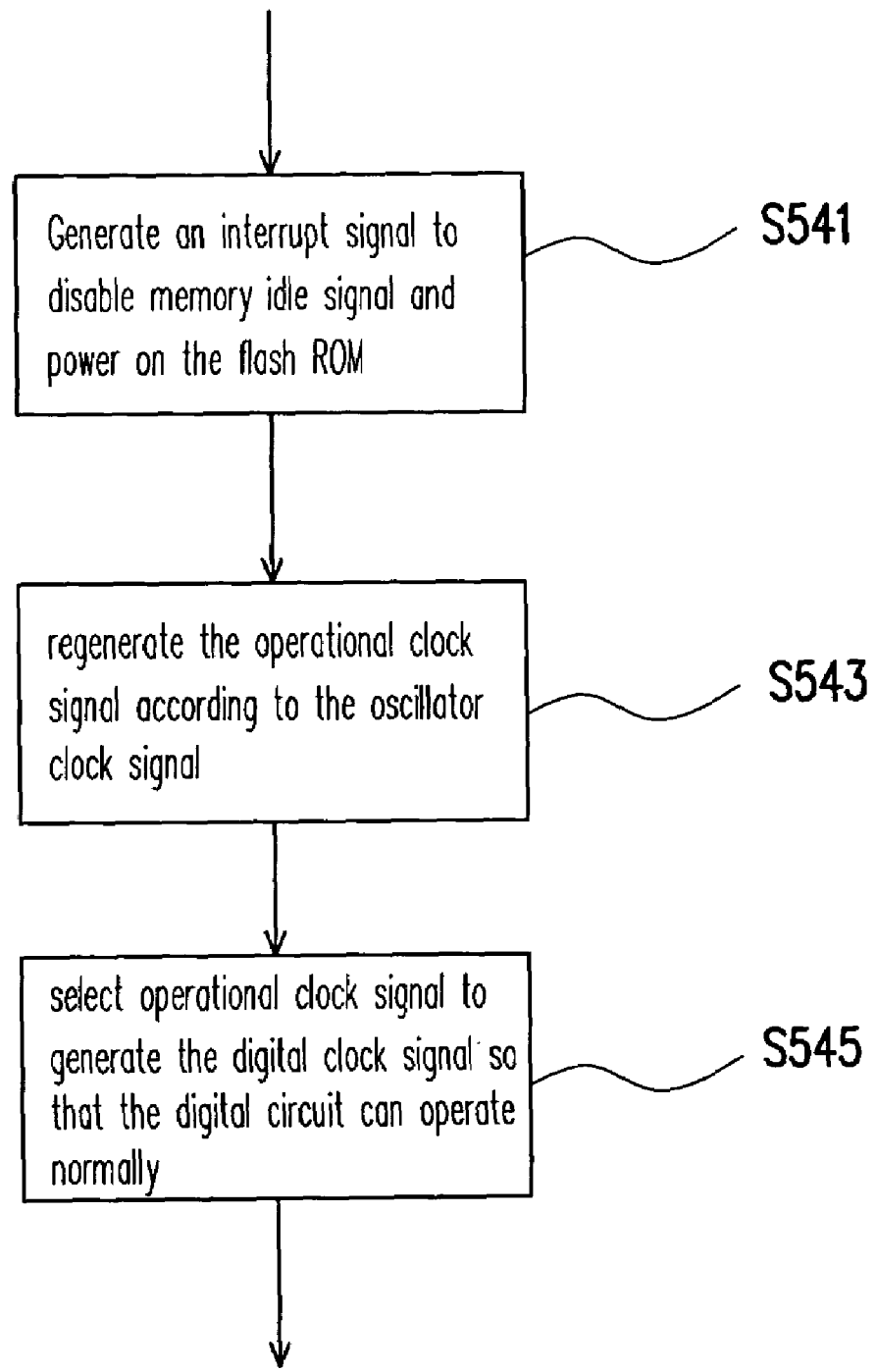
FIG. 5B is a flow-chart showing the steps for returning an electronic device in a power-saving mode back to a normal operation mode according to another embodiment of present invention.

FIG. 5B is a flow-chart showing the steps of returning an electronic device from a power-saving mode back to a normal operation mode according to another embodiment of present invention. As shown in FIGS. 5B and 6C, if an external event occurs when the electronic device is in the standby mode or the sleep mode, an interrupt signal INT is generated at time T4. The interrupt signal INT disables the memory idle signal IDLE and returns power to the flash ROM in step S541. Thereafter, in step S543, the clock power signal PDCKG and the clock reset signal RSTCKG are disabled at time T5 so that the operational clock signal CLK2 is regenerated according to the oscillator clock signal CLK1. After the operational clock signal CLK2 has been stabilized, the select signal SEL is disabled at time T6 in step S545 to produce the digital clock signal DCLK using the operational clock signal CLK2 so that the digital circuit 409 returns to normal operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power-saving control circuitry of an electronic device with a digital circuit, the power-saving control circuitiy comprising:
   a power control circuit, for generating an oscillator power signal, a clock power signal and a digital power signal;
   an oscillator, for generating an oscillator clock signal, wherein the oscillator operates or shuts down according to the oscillator power signal;
   a clock pulse generator, for generating an operational clock signal according to the oscillator clock signal, wherein the clock pulse generator operates or shuts down according to the clock power signal; and
   a multi-enable module, for transmitting a digital clock signal to the digital circuit according to the digital power signal, wherein the multi-enable module produces the digital clock signal according to a select signal and based on one of the following: the operational clock signal and the oscillator clock signal.

2. The power-saving control circuitry of claim 1, wherein the electronic device further comprises a memory that operates or shuts down according to at least one of the following: the oscillator power signal, the clock power signal and the digital power signal, and wherein the memory comprises a flash ROM.

3. The power-saving control circuitry of claim 1, wherein the multi-enable module further comprises:
   a multiplexer, for receiving the oscillator clock signal and the operational clock signal and generating an output clock signal according to one of the following: the select signal for using either the oscillator clock signal and the operational clock signal; and
   an AND gate with one input terminal set to receive the output clock signal, a second input terminal set to receive an inverted digital power signal, and an output terminal for outputting the digital clock signal.

4. The power-saving control circuitry of claim 1, wherein the electronic device further comprises an independent reserve circuit that originally belongs to the digital circuit and continues to operation even when other portions of the digital circuits are not operating, moreover, the reserve circuit operates by receiving the oscillator clock signal.

5. The power-saving control circuitry of claim 4, wherein power to the oscillator is cut off after the electronic device enters the power-saving mode and when both the clock signals to the digital circuit and the reserve circuit for performing various functions are no longer required.

6. A power-saving method of reducing the power consumption of an electronic device with a digital circuit therein, wherein the digital circuit is normally activated by a digital clock signal derived from an operational clock signal, the method comprising the steps of:
   enabling a clock power signal to stop a clock pulse generator from generating the operational clock signal;
   enabling an oscillator power signal to stop an oscillator from generating an oscillator clock signal;
   enabling a digital power signal to stop a multi-enable module from generating the digital clock signal; and
   using the operational clock signal again to generate the digital clock signal after detecting the occurrence of an external event so that the digital circuit returns to normal operation.

7. The power-saving method of claim 6, wherein the electronic device further comprises a memory that can be shut down by transmitting a signal selected from a group consisting of the clock power signal and the digital power signal, moreover, the memory could be a flash ROM.

8. The power-saving method of claim 6, wherein the method further comprises the step of:
   using an oscillator clock signal instead of the operational clock signal to generate the digital clock signal and stopping the production of operational clock signal, wherein the operational clock signal has a frequency greater than the frequency of the oscillator clock signal, and wherein the production of the oscillator clock signal can be stopped by enabling an oscillator power signal.

9. The power-saving method of claim 6, wherein the method further comprises the step of:
   building a reserve circuit by collecting all the circuits within the digital circuit, wherein the reserve circuit still need to operate even after the transmission of digital clock signal to the digital circuit has stopped; and
   re-routing the digital clock signal to the reserve circuit so that the reserve circuit continues to operate normally and stopping the transmission of digital clock signal to shut down the digital circuit.

10. The power-saving method of claim 9, wherein the steps of returning the electronic device back to a normal operation mode comprise:

disabling the digital power signal to produce the digital clock signal;

disabling the clock power signal to produce the operational clock signal; and selecting the operational clock signal to produce the digital clock signal so that the digital circuit can operate normally; wherein when the electronic device further comprises a memory, a signal is also transmitted to turn on the memory in tandem with the production of the digital clock signal and the operational clock signal.

11. The power-saving method of claim 8, wherein the steps of returning the electronic device back to a normal operation mode after the production of oscillator clock signal has stopped comprise:

disabling the oscillator power signal to enable the oscillator clock signal;

disabling the clock power signal to produce the operational clock signal according to the oscillator clock signal; and disabling the digital power signal and selecting the operational clock signal to produce the digital clock signal; wherein when the electronic device comprises a memory, a signal is also transmitted to turn on the memory in tandem with The disabling of the oscillator power signal, the clock power signal and the digital power signal.

* * * * *